United States Patent
Vessenes (12) United States Patent (10) Patent No.: US 10,956,582 B1
(45) Date of Patent: Mar. 23, 2021

(54) SYSTEMS AND METHODS FOR SECURE STORAGE OF ENCRYPTED DATA ON A DISTRIBUTED COMPUTING PLATFORM, THE DISTRIBUTED COMPUTING PLATFORM BEING BASED ON A DISTRIBUTED LEDGER

(71) Applicant: Alchemy Limited, LLC, Seattle, WA (US)

(72) Inventor: Peter Joseph Vessenes, Bainbridge Island, WA (US)

(73) Assignee: Alchemy Limited, LLC, Seattle, WA (US)

( * ) Notice: Subject to any disclaimer, the term of this patent is extended or adjusted under 35 U.S.C. 154(b) by 172 days.

(21) Appl. No.: 16/006,585

(22) Filed: Jun. 12, 2018

Related U.S. Application Data (60) Provisional application No. 62/519,083, filed on Jun. 13, 2017.

(51) Int. Cl.
| | |
|---|---|
| G06F 21/60 | (2013.01) |
| H04L 9/32 | (2006.01) |
| H04L 9/08 | (2006.01) |
| H04L 9/14 | (2006.01) |

(52) U.S. Cl.
CPC ............ *G06F 21/602* (2013.01); *H04L 9/085* (2013.01); *H04L 9/14* (2013.01); *H04L 9/3247* (2013.01)

(58) Field of Classification Search
CPC .......... G06F 9/466–467; G06F 16/182–1844; G06F 16/1865; G06F 21/602; G06F 21/6218–6245; G06F 21/6272; G06F 21/64–645; H04L 2209/38; H04L 2209/56; H04L 9/0643; H04L 9/085; H04L 9/14; H04L 9/3236–3242; H04L 9/3247–3257; H04L 67/10–1097

See application file for complete search history.

(56) References Cited

U.S. PATENT DOCUMENTS

| | | | |
|---|---|---|---|
| 2016/0004877 A1* | 1/2016 | Hayes ................. | G06F 21/6218 713/165 |
| 2017/0286717 A1* | 10/2017 | Khi ......................... | H04L 63/06 |

* cited by examiner

*Primary Examiner* — Kevin Bechtel
(74) *Attorney, Agent, or Firm* — Sheppard Mullin Richter & Hampton LLP (57) ABSTRACT

Systems and methods for secure storage of encrypted data on a distributed computing platform are disclosed. Exemplary implementations may: obtain data to be encrypted and securely stored; split the data into a set of data portions; receive, from a set of storage servers, a set of cryptographic keys; combine the set of cryptographic keys with one or more elements of client information to create a set of encryption keys to be used for encrypted communication; encrypt the set of data portions using the set of encryption keys; create one or more storage-request messages intended for the set of storage servers; post the one or more storage-request messages to the distributed ledger; and receive a set of confirmation messages that confirm storage of individual ones of the encrypted set of data portions such that an individual confirmation message confirms storage of an individual encrypted data portion.

20 Claims, 4 Drawing Sheets

SYSTEMS AND METHODS FOR SECURE STORAGE OF ENCRYPTED DATA ON A DISTRIBUTED COMPUTING PLATFORM, THE DISTRIBUTED COMPUTING PLATFORM BEING BASED ON A DISTRIBUTED LEDGER

FIELD OF THE DISCLOSURE

The present disclosure relates to systems and methods for secure storage of encrypted data on a distributed computing platform, the distributed computing platform being based on a distributed ledger.

BACKGROUND

Distributed ledgers or decentralized ledgers are known techniques to produce a secure record or registry of ownership of assets, transactions, and other information. For example, a blockchain is a distributed ledger. Blockchain technology is known, e.g. as used for cryptocurrencies, smart contracts, and other applications for a decentralized database. Securing data by using various types of encryption is known.

SUMMARY

One aspect of the present disclosure relates to one or more systems configured for secure storage and subsequent retrieval of encrypted data on a distributed computing platform, the distributed computing platform being based on a distributed ledger. The system may include one or more hardware processors configured by machine-readable instructions. The processor(s) may be configured to obtain data to be encrypted and securely stored. The processor(s) may be configured to split the data into a set of data portions. The set of data portions may include a predetermined number of data portions. The predetermined number may be greater than one. The processor(s) may be configured to receive, from individual ones of a set of storage servers, individual ones of a set of cryptographic keys. The set of storage servers may include the predetermined number of storage servers. The processor(s) may be configured to combine the set of cryptographic keys with one or more elements of client information to create a set of encryption keys to be used for encrypted communication between the system and the set of storage servers. An individual encryption key may correspond to an individual storage server from the set of storage servers. The processor(s) may be configured to encrypt the set of data portions using the set of encryption keys. The processor(s) may be configured to create one or more storage-request messages intended for the set of storage servers. The one or more storage-request messages may include the encrypted set of data portions. The processor(s) may be configured to post the one or more storage-request messages to the distributed ledger. The processor(s) may be configured to receive, from individual ones of the set of storage servers, individual ones of a set of confirmation messages that confirm storage of individual ones of the encrypted set of data portions such that an individual confirmation message confirms storage of an individual encrypted data portion.

To retrieve the stored data, the processor(s) may be configured to generate one or more retrieval-request messages. The one or more retrieval-request messages may include a particular cryptographic key and a digital signature. The processor(s) may be configured to post the one or more retrieval-request messages to the distributed ledger. The processor(s) may be configured to, responsive to the one or more retrieval-request messages being validated, receive, from individual ones of the set of storage servers, individual ones of a set of re-encrypted data portions. The individual storage server may have created an individual re-encrypted data portion by decrypting the individual encrypted data portion and subsequently encrypting the decrypted individual data portion with the particular cryptographic key. The processor(s) may be configured to decrypt the set of re-encrypted data portions into a set of decrypted data portions. The processor(s) may be configured to reconstruct the data by combining the set of decrypted data portions.

Another aspect of the present disclosure relates to one or more methods for secure storage and subsequent retrieval of encrypted data on a distributed computing platform, the distributed computing platform being based on a distributed ledger. The method may include obtaining data to be encrypted and securely stored. The method may include splitting the data into a set of data portions. The set of data portions may include a predetermined number of data portions. The method may include receiving, from individual ones of a set of storage servers, individual ones of a set of cryptographic keys. The method may include combining the set of cryptographic keys with one or more elements of client information to create a set of encryption keys to be used for encrypted communication between the system and the set of storage servers. An individual encryption key may correspond to an individual storage server from the set of storage servers. The method may include encrypting the set of data portions using the set of encryption keys. The method may include creating one or more storage-request messages intended for the set of storage servers. The one or more storage-request messages may include the encrypted set of data portions. The method may include posting the one or more storage-request messages to the distributed ledger. The method may include receiving, from individual ones of the set of storage servers, individual ones of a set of confirmation messages that confirm storage of individual ones of the encrypted set of data portions such that an individual confirmation message confirms storage of an individual encrypted data portion.

To retrieve the stored data, a method may include generating one or more retrieval-request messages. The one or more retrieval-request messages may include a particular cryptographic key and a digital signature. The method may include posting the one or more retrieval-request messages to the distributed ledger. The method may include, responsive to the one or more retrieval-request messages being validated, receiving, from individual ones of the set of storage servers, individual ones of a set of re-encrypted data portions. The individual storage server may have created an individual re-encrypted data portion by decrypting the individual encrypted data portion and subsequently encrypting the decrypted individual data portion with the particular cryptographic key. The method may include decrypting the set of re-encrypted data portions into a set of decrypted data portions. The method may include reconstructing the data by combining the set of decrypted data portions.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
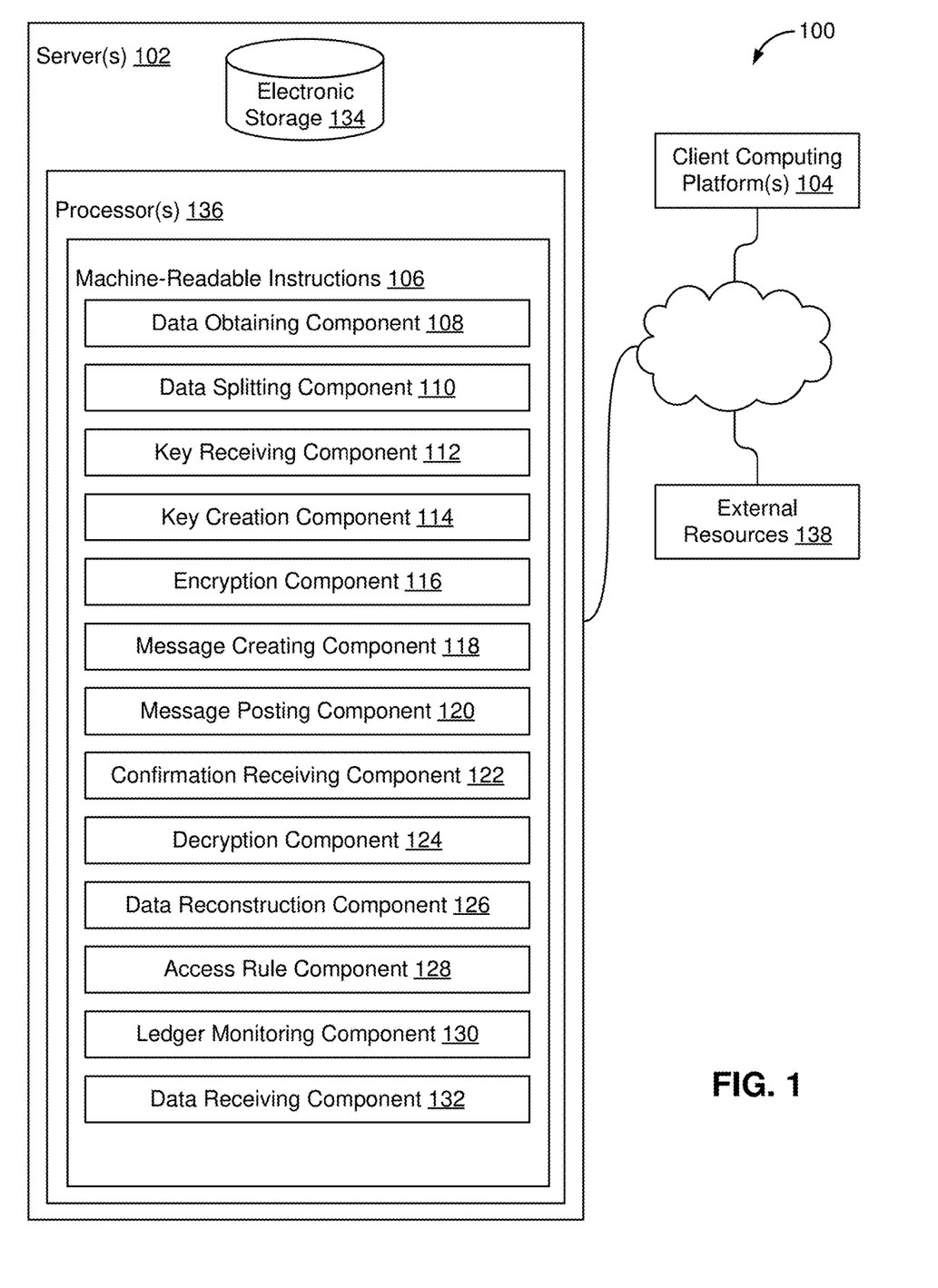
FIG. 1 shows a system configured for secure storage of encrypted data on a distributed computing platform, the distributed computing platform being based on a distributed ledger, in accordance with one or more implementations.

FIG. 1 illustrates a system 100 configured for secure storage and subsequent retrieval of encrypted data on a distributed computing platform, the distributed computing platform being based on a distributed ledger, in accordance with one or more implementations. In some implementations, system 100 may include one or more servers 102. Server(s) 102 may include one or more storage servers and/or other servers. As used herein, a storage server may be a type of server that is used to store, access, secure and manage digital data, files and/or services. It may be a purpose-built server used for storing and accessing small to large amounts of data, e.g., operating over a shared network or through the Internet.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. In some implementations, client computing platforms 104 may be associated with different users and/or participants. The distributed platform may be implemented by a set of client computing platforms and/or (storage) servers.

The distributed computing platform may support a virtual machine. The virtual machine may form a runtime environment for smart contracts and/or other transactions. The distributed computing platform may include storage configured to store the distributed ledger. The smart contracts and/or other information may be stored on the distributed ledger. In some implementations, applications may be stored and/or executed on the distributed ledger. For example, such an application may be referred to as a distributed application. In some implementations, the distributed computing platform may be Ethereum, or similar to Ethereum. In some implementations, the distributed computing platform may support a virtual machine. In some implementations, the virtual machine may be a Turing-complete and decentralized virtual machine.

The distributed ledger may act as a decentralized database that stores a registry of assets, transactions, and/or other information across one or more networks. A given asset may be owned by a particular user. The asset may include anything of material value or usefulness that is owned by a person or company, according to some implementations. In some implementations, the distributed ledger may record ownership of assets and/or transactions that modify ownership of assets. A smart contract is a type of asset. In some implementations, data may be a type of asset, e.g., encrypted data. In some implementations, once a smart contract, transaction, and/or message has been added to the distributed ledger, it may be referred to as published and/or posted. In some implementations, encrypted data that is posted may be part of a transaction and/or service, e.g., between a participant and one or more storage servers. Storage and/or retrieval of (encrypted) data may be a service offered through a distributed application implemented through the distributed computing platform that is based on a distributed ledger.

Elements of the distributed ledger may be grouped together in units that are referred to as blocks. For example, an individual block may include one or more assets, transactions, and/or other information. The distributed ledger may be publicly accessible and append-only. In some implementations, existing blocks of the distributed ledger can substantially not be altered or deleted, unless multiple copies of the distributed ledger are altered. This is unlikely to happen provided that multiple copies of the distributed ledger are stored on different computing platforms, e.g. in different geographical locations. The distributed ledger may be replicated on multiple computing platforms, preferably in multiple different geographical locations.

Figure 3:
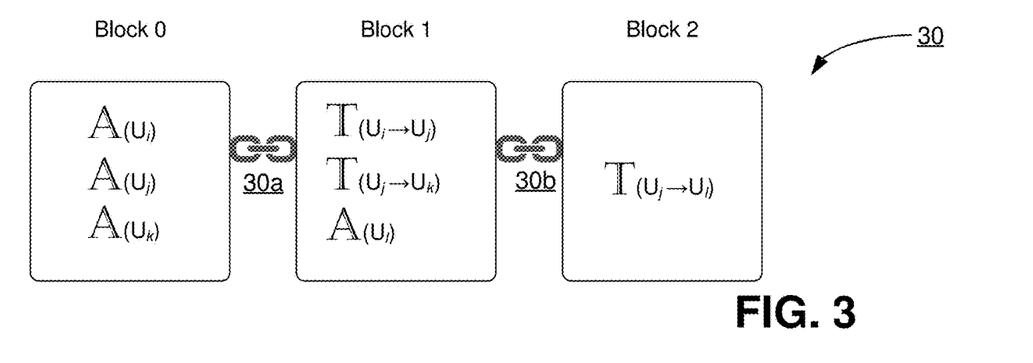
FIGS. 3, 4, and 5 illustrate exemplary distributed ledgers in accordance with use by one or more embodiments.

By way of non-limiting example, FIG. 3 illustrates a distributed ledger 30 that includes a block 0, a block 1, and a block 2. As time progresses, more blocks may be added to distributed ledger 30. The blocks within distributed ledger 30 are ordered. In block 0, three assets (indicated by a capital "A") are generated and/or assigned to three users or participants: a first asset is assigned to user i ($U_i$), a second asset is assigned to user j ($U_j$), and a third asset is assigned to user k ($U_k$). Block 1 is connected to block 0 (as indicated by a link 30a), for example by including an address of block 1 in block 0, or vice versa. Likewise, block 1 is connected to block 2, as indicated by a link 30b.

In block 1, one asset is generated and/or assigned to user l ($U_l$). Additionally, block 1 includes two transactions (indicated by a capital "T"): a first transaction from user i to user j, and a second transaction from user j to user k. Block 2 includes a transaction from user j to user l. In some implementations, based on the contents of the blocks, any user of distributed ledger 30 may determine the current assets of the distributed ledger, and/or the balances/property of any user. In some implementations, the balance or property of a particular user may be verified prior to adding a transaction that reduces that particular user's balance or reassigns that property. For example, an individual user may not be allowed to transfer more assets than the individual user owns.

Referring to FIG. 1, server(s) 102 may be configured by machine-readable instructions 106. Machine-readable instructions 106 may include one or more instruction components. The instruction components may include computer program components. The instruction components may include one or more of a data obtaining component 108, a data splitting component 110, a key receiving component 112, a key creation component 114, an encryption component 116, a message creating component 118, a message posting component 120, a confirmation receiving component 122, a decryption component 124, a data reconstruction component 126, an access rule component 128, a ledger monitoring component 130, a data receiving component 132, and/or other instruction components.

Data obtaining component 108 may be configured to determine and/or obtain data to be encrypted, securely stored, and/or subsequently retrieved from storage. The data may include anything of material value or usefulness that is owned by a person or company. In some implementations, data may be private, confidential, and/or otherwise secret or intended to be secret.

Data splitting component 110 may be configured to split and/or divide the data into a set of data portions. The set of data portions may include a predetermined number of data portions. The predetermined number may be greater than one. In some implementations, splitting the data into the set of data portions may be performed such that an individual data portion reveals little or no information regarding the secret contained in the data. Splitting the data into the set of data portions may be performed such that reconstruction of the data requires at least a predetermined number of individual data portions from the set of data portions. Reconstruction may correspond to the process used for splitting the data. Splitting the data into the set of data portions may be performed in a manner based on Shamir's Secret Sharing algorithm. For example, secret data S may be split in three data portions, S1, S2, and S3, so that secret data S can be calculated (e.g. using finite field arithmetic) if and only if all of S1, S2, and S3 are known. In some implementations, data portions S1, S2, and S3 do not include a part of secret data S, but rather include information that can be used to derive and/or otherwise determine secret data S.

Key receiving component 112 may be configured to receive, from individual ones of a set of storage servers, individual ones of a set of cryptographic keys. The set of storage servers may include at least the predetermined number of storage servers. Cryptographic keys may include one or more of encryption keys, decryption keys, and/or other cryptographic keys. In some implementations, a cryptographic key may be a private key. In some implementations, a cryptographic key may be a public key. In some implementations, a cryptographic key may be a key pair, e.g., a key pair that includes a public key and a private key. For example, in some implementations, a key pair may include a public encryption key and a private decryption key. Receiving the individual ones of the set of cryptographic keys may be accomplished through one or more key messages posted to the distributed ledger by the set of storage servers. A key message is a message, including but not limited to a transaction, asset, smart contract, and/or other element of a block in a distributed ledger, that includes a cryptographic key and/or includes information related to a cryptographic key.

For example, in some implementations, key receiving component 112 may be configured to receive a different cryptographic key from each storage server. In some implementations, a distributed application may request and/or otherwise prompt one or more storage servers, responsive to entry and/or selection by a participant through a particular client computing platform, to provide a key message to the distributed ledger. For example, the set of storage servers may include storage server 1, storage server 2, storage server 3, and so forth. Key receiving component 112 may receive a cryptographic key K1 from storage server 1, a cryptographic key K2 from storage server 2, a cryptographic key K3 from storage server 3, and so forth.

Key creation component 114 may be configured to create one or more cryptographic keys. In some implementations, key creation component 114 may be configured to create one or more cryptographic keys, e.g., by combining a set of cryptographic keys with one or more elements of (secret) client information. In some implementations, a created set of encryption keys may be used for encrypted communication between one or more of the system, a client computing platform, a participant, a distributed application, and/or the set of storage servers. For example, an individual created encryption key may be used to encrypt data for a particular storage server such that the particular storage server can decrypt the encrypted data using a different cryptographic key that forms a key pair with the individual created encryption key. In some implementations, an individual created cryptographic key may be a symmetric key.

An individual encryption key may correspond to an individual storage server from the set of storage servers. A first element of client information may be shared with the individual storage server. For example, an element of client information may be a shared secret with the individual storage server. For example, a shared secret may be established by using an algorithm based on the Diffie-Hellman key exchange concept. In some implementations, a different element of client information may be used to create a cryptographic key for each of a set of storage servers. For example, the element of client information may be a client secret CS. Key creation component 114 may create a cryptographic key (CS+K1) for use with storage server 1, a cryptographic key (CS+K2) for use with storage server 2, a cryptographic key (CS+K3) for use with storage server 3, and so forth.

Encryption component 116 may be configured to encrypt data. In some implementations, encryption component 116 may be configured to encrypt a set of data portions. A set of data portions that has been encrypted may be referred to as an encrypted set of data portions. In some implementations, encryption by encryption component 116 may use a set of encryption keys. For example, encryption by encryption component 116 may use a set of encryption keys created by key creation component 114. Encryption may be used by client computing platforms, storage servers, and/or other elements of system 100. For example, data portions S1, S2, and S3 may be encrypted using (combined) cryptographic keys (CS+K1), (CS+K2), and (CS+K3). The encrypted data may be referred to as CSK1(S1), CSK2(S2), CSK3(S3), and so forth.

Message creating component 118 may be configured to create one or more storage-request messages intended for the set of storage servers. A storage-request message is a message, including but not limited to a transaction, asset, smart contract, and/or other element of a block in a distributed ledger, that includes or represents a request to store data, e.g., a request intended for one or more storage servers. In some implementations, the one or more storage-request messages may include the data to be stored, e.g., an encrypted set of data portions. In some implementations, the one or more storage-request messages may provide a link and/or connection to the data to be stored, e.g., an encrypted set of data portions.

In some implementations, message creating component 118 may be configured to generate one or more retrieval-request messages. A retrieval-request message is a message, including but not limited to a transaction, asset, smart contract, and/or other element of a block in a distributed ledger, that includes or represents a request to retrieve data, e.g., a request intended for one or more storage servers. The one or more retrieval-request messages may include one or more of a particular cryptographic key, a digital signature, and/or other information. For example, in some implementations, a retrieval-request message may include a private destination encryption key. As used herein, a digital signature may be information that authenticates one or more of the contents of a message (e.g., the integrity of a message), the sender of a message (e.g., the identity of the sender), or another part or entity related to a particular message. By way of non-limiting example, a digital signature may be generated by applying a cryptographic hash of the data to be signed, and encrypting this hashed value with a private encryption key that corresponds to a public decryption key. A recipient of the digital signature can use the public decryption key to retrieve the hashed value, and compare it with a locally-computed hashed value for the signed/encrypted data. A cryptographic hash function may be a function that converts arbitrary-length input to a fixed-length output.

Message posting component 120 may be configured to post messages to the distributed ledger. For example, message posting component 120 may post one or more storage-request messages to the distributed ledger. In some implementations, an individual storage server may monitor activity on the distributed ledger and take action in case a particular (storage-request) message is relevant to the individual storage server. In some implementations, posted messages may be appended to the distributed ledger as part of one or more blocks.

Figure 4:
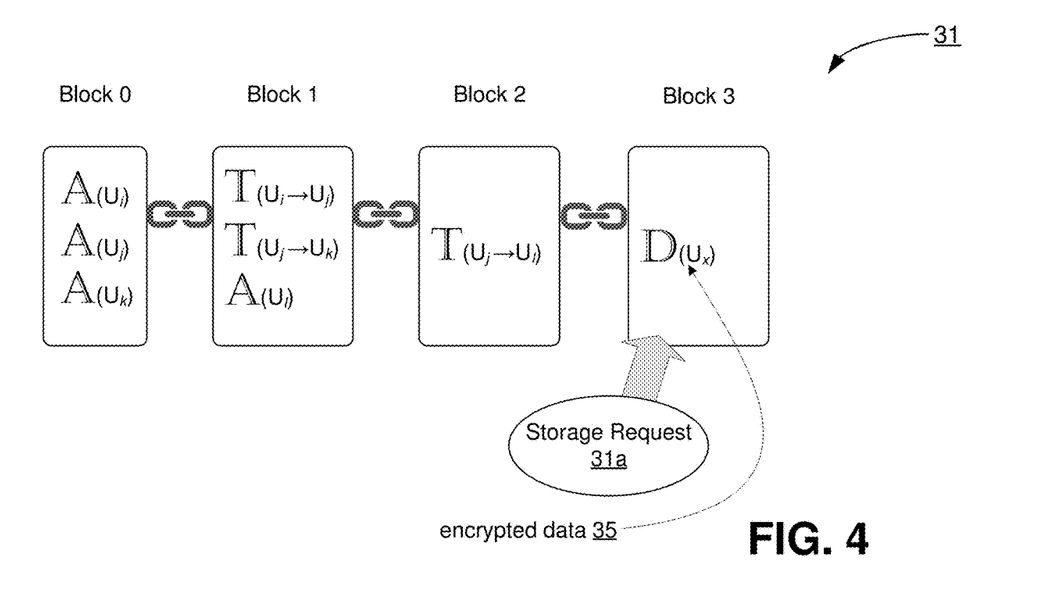

By way of non-limiting example, FIG. 4 illustrates a distributed ledger 31 that includes the same blocks as distributed ledger 30 of FIG. 3, plus an additional block 3 that has been appended to the distributed ledger. In block 3, a storage request 31a (indicated by a capital "D") is posted by a user x ($U_x$). Storage request 31a may include encrypted data 35 (which may include a set of data portions) that is to be stored by a set of storage servers. In some implementations, different data portions may be posted as part of different storage requests.

Referring to FIG. 1, message posting component 120 may be configured to post one or more retrieval-request messages to the distributed ledger that are intended for one or more storage servers. In some implementations, a transaction and/or other type of instruction to store certain (encrypted) data may be considered complete upon posting of the pertinent one or more storage-request messages to the distributed ledger. In some implementations, a transaction and/or other type of instruction to store certain (encrypted) data may be considered complete upon confirmation by the one or more storage servers, e.g., through confirmation messages received by confirmation receiving component 122.

Figure 5:
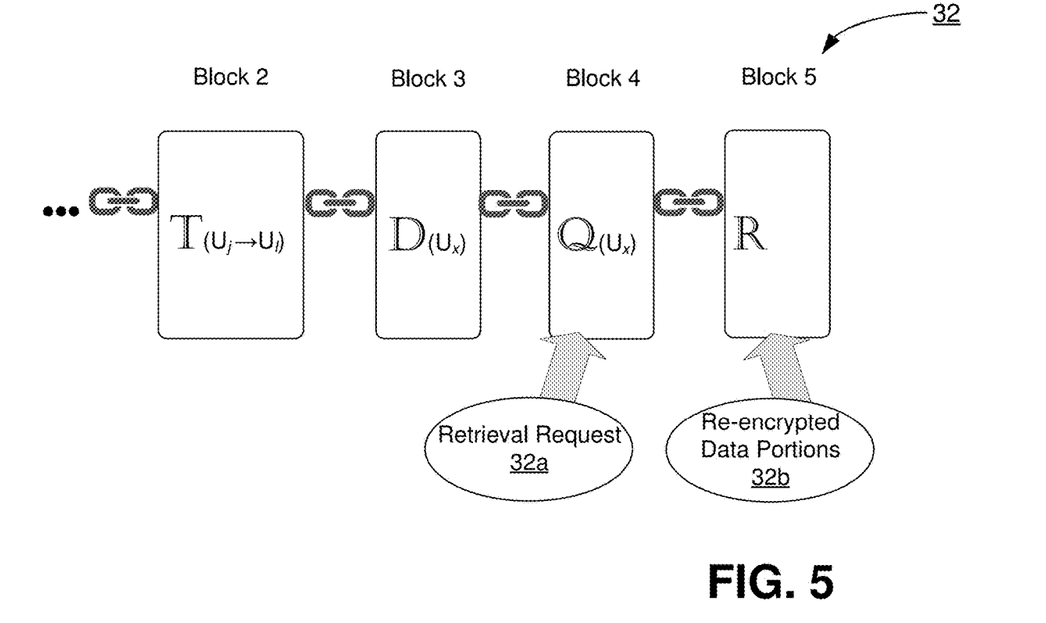

By way of non-limiting example, FIG. 5 illustrates a distributed ledger 32 that includes the same blocks (although not all are depicted) as distributed ledger 31 of FIG. 4, plus additional blocks 3 and 4 that has been appended to the distributed ledger. In block 4, a retrieval request 32a (indicated by a capital "Q") is posted by user x ($U_x$). Retrieval request 32a may include a digital signature, a cryptographic key, and/or other information. In block 5, one or more re-encrypted data portions 32b (indicated by a capital "R") are posted by one or more storage servers, and subsequently received by a client computing platform associated with user x. Upon receipt, the system (e.g., through a distributed application) can decrypt the one or more re-encrypted data portions 32b and reconstruct the data as originally split and encrypted.

Referring to FIG. 1, confirmation receiving component 122 may be configured to receive one or more confirmation messages. For example, confirmation receiving component 122 may be configured to receive, from individual ones of the set of storage servers, individual ones of a set of confirmation messages. For example, the individual confirmation messages may confirm storage of individual ones of an encrypted set of data portions. For example, an individual confirmation message may confirm storage of an individual encrypted data portion on a particular storage server. A confirmation message is a message, including but not limited to a transaction, asset, smart contract, and/or other element of a block in a distributed ledger, that includes or represents a confirmation that certain data has been stored. For example, a confirmation message may be received from one or more storage servers. For example, a confirmation message may pertain to the storage of one or more of unencrypted data, encrypted data, and/or other types of data. In some implementations, the exchange and usage of cryptographic keys is performed in such a manner that an individual storage server cannot obtain and/or otherwise derive an unencrypted data portion. In some implementations, the individual storage server may be able to derive an unencrypted data portion, but this data portion is encrypted anew (possibly with a different cryptographic key) before being posted and/or otherwise transmitted.

In some implementations, receiving the individual ones of the set of confirmation messages may be accomplished through the set of confirmation messages being posted to the distributed ledger by the set of storage servers. The individual ones of the set of confirmation messages may be encrypted by the set of storage servers using a client's public encryption key.

Data receiving component 132 may be configured to receive data. For example, data receiving component 132 may be configured to receive data from one or more storage servers. In some implementations, data receiving component 132 may be configured to receive, responsive to one or more retrieval-request messages being validated, receive, from individual ones of the set of storage servers, individual ones of a set of re-encrypted data portions. Validation of the one or more retrieval-request messages by the individual storage server may include a determination whether a digital signature indicates the integrity of the data and/or the identity of the sender(s).

Receiving the individual ones of the set of re-encrypted data portions may be accomplished through one or more response messages being posted to the distributed ledger by the set of storage servers. An individual storage server may have created an individual re-encrypted data portion by decrypting the individual encrypted data portion (e.g., by using decryption component 124) and subsequently encrypting the decrypted individual data portion, e.g., with the particular cryptographic key (e.g., by using encryption component 116).

Decryption component 124 may be configured to decrypt data. In some implementations, decryption component 124 may be configured to decrypt a set of data portions. For example, decryption component 124 may be configured to decrypt a set of re-encrypted data portions into a set of decrypted data portions. A set of data portions that has been decrypted may be referred to as a decrypted set of data portions. In some implementations, decryption by decryption component 124 may use a set of decryption keys. For example, decryption by decryption component 116 may use one or more decryption keys created by key creation component 114, or included in a particular message. Decryption may be used by client computing platforms, storage servers, and/or other elements of system 100.

Data reconstruction component 126 may be configured to reconstruct data by combining the set of decrypted data portions. The reconstructed data may be the original data as obtained by data obtaining component 108. Reconstruction may correspond to the process used for splitting the original data by data splitting component 110. Reconstruction of the original data may require at least a predetermined number of individual data portions from the set of data portions. In some implementations, all individual data portions may be required to reconstruct the original data.

Access rule component 128 may be configured to obtain one or more sets of access rules. An individual set of access rules may control access to the associated individual storage server and/or to particular data stored thereon. In some implementations, access may be restricted and/or limited to certain clients, or at certain times. In some implementations, the number of attempts to access particular data may be limited to a maximum number of attempts per time unit, e.g. per minute, per hour, per day, per week, etc. In some implementations, access maybe conditioned on an API call, e.g. an off-ledger API call. In some implementations, access may be conditioned on whether a particular address and/or account on a distributed ledger has been funded. In some implementations, access may be conditioned to other types of business process logic. In some implementations, one or more of the preceding restrictions, limitations, and/or conditions may be logically combined. For example, a first user may be permitted no more than 10 attempts at access per day, whereas a second user may be permitted no more than 5 attempts at access per minute. For example, a third user may be permitted access provided that a particular account on the distributed ledger has a balance in a particular cryptocurrency that exceeds a minimum threshold, whereas a fourth user may be permitted access provided that a different account on the distributed ledger has a balance in a (different) cryptocurrency that exceeds a different minimum threshold. In some implementations, access to particular data and/or attempts at access to the particular data may require expenditure of a certain amount of a particular cryptocurrency.

An individual set of access rules may be associated with the individual storage server. The individual set of access rules may be included in the one or more storage-request messages. In some implementations, validation of the one or more retrieval-request messages by the individual storage server may include a determination whether retrieval is in accordance with the individual set of access rules.

Figure 6:
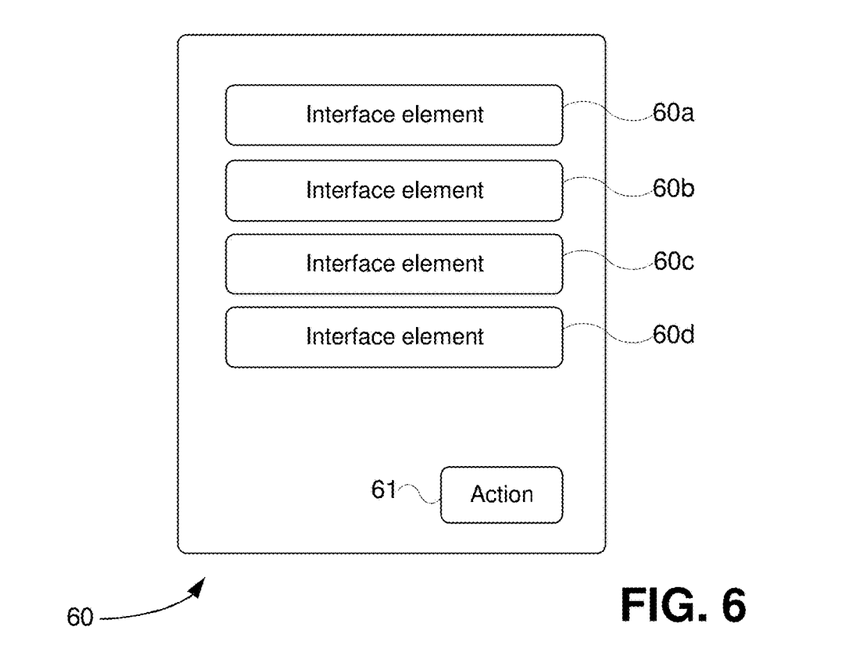
FIG. 6 illustrates an exemplary user interface as may be used by one or more embodiments described herein.

By way of non-limiting example, FIG. 6 illustrates a user interface 60 as may be used by a user or participant to perform secure storage and retrieval of encrypted data. For example, user interface 60 may be part of a distributed application. User interface 60 may include user interface elements including element 60*a*, 60*b*, 60*c*, 60*d*, 61, and/or other user interface elements. Element 60*a* may be used to present an interface for the user to enter and/or select particular data that is to be encrypted and stored securely. Element 60*b* may be used to present an interface for the user to enter and/or select the number or type of storage servers that is to be used to store the encrypted data. Element 60*c* may be used to present an interface for the user to enter and/or select a client secret that is to be used to create cryptographic keys to encrypt the data. Element 61 may be used to confirm a particular action and/or decision by the user in accordance with other elements displayed in user interface 60. For example, element 91 may be used to confirm an instruction to split the data selected by element 60*a* into a number of data portions indicated by element 60*b*, encrypt those data portions using the client secret indicated by element 60*c*, and subsequently post a storage-request message (similar to storage request 31*a* in FIG. 4) to the distributed ledger. In some implementations, element 60*d* may be used to present an interface to the user to enter and/or select one or more access rules that are to be used for the stored data. In some implementations, one or more user interface elements in user interface 60 may be used to indicate to a user that the secure storage has been completed successfully, e.g., based on receipt of one or more confirmation messages.

In some implementations, one or more user interface elements in user interface 60 may be used to present an interface to the user to enter and/or select options and/or information needed to retrieve the stored data. For example, element 60*a* may be used to present an interface for the user to enter and/or select particular data that is to be retrieved. Element 60*b* may be used to present an interface for the user to enter, select, and/or create a digital signature, a cryptographic key, and/or other information that is to be used to retrieve the encrypted data. Element 61 may be used to confirm a particular action and/or decision by the user in accordance with other elements displayed in user interface 60. For example, element 91 may be used to confirm an instruction to retrieve the stored data as indicated by element 60*a* and element 60*b*, and subsequently post a retrieval-request message (similar to retrieval request 32*a* in FIG. 5) to the distributed ledger. In some implementations, elements 60*c* and/or 60*d* may be used to present an interface to the user to enter and/or select information needed to satisfy one or more access rules that are being used for the stored data. Some of the elements in user interface 60 may be populated automatically without manual input from a human participant. In some implementations, one or more user interface elements in user interface 60 may be used to present posted re-encrypted data portions to the user (similar to re-encrypted data portions 32*b* in FIG. 5). In some implementations, one or more user interface elements in user interface 60 may be used to present decrypted data portions to the user. In some implementations, one or more user interface elements in user interface 60 may be used to present reconstructed data to the user. In some implementations, intermediate results such as re-encrypted data portions or decrypted data portions may not be presented to a user, and instead only the reconstructed data is presented.

Referring to FIG. 1, ledger monitoring component 130 may be configured to monitor and/or audit messages posted on the distributed ledger. In some implementations, ledger monitoring component may be configured to determine whether a particular access rule has been violated. In some implementations, ledger monitoring component may be configured to determine whether a particular storage server is operating properly in accordance with the pertinent rules and guidelines.

In some implementations, server(s) 102, client computing platform(s) 104, and/or external resources 138 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 138 may be operatively linked via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 138 may include sources of information outside of system 100, external entities participating with system 100, and/or other resources. In some implementations, some or all of the functionality attributed herein to external resources 138 may be provided by resources included in system 100. In some implementations, external resources 138 may include one or more storage servers.

Server(s) 102 may include electronic storage 134, one or more processors 136, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 134 may comprise non-transitory storage media that electronically stores information. The electronic storage media of electronic storage 134 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 134 may include one or more virtual storage resources (e.g., cloud storage, a virtual private network, and/or other virtual storage resources). Electronic storage 134 may store software algorithms, information determined by processor(s) 136, information received from server(s) 102, information received from client computing platform(s) 104, and/or other information that enables server(s) 102 to function as described herein.

Processor(s) 136 may be configured to provide information processing capabilities in server(s) 102. As such, processor(s) 136 may include one or more of a digital processor, an analog processor, a digital circuit designed to process information, an analog circuit designed to process information, a state machine, and/or other mechanisms for electronically processing information. Although processor(s) 136 is shown in FIG. 1 as a single entity, this is for illustrative purposes only. In some implementations, processor(s) 136 may include a plurality of processing units. These processing units may be physically located within the same device, or processor(s) 136 may represent processing functionality of a plurality of devices operating in coordination. Processor(s) 136 may be configured to execute components 108-132, and/or other components. Processor(s) 136 may be configured to execute components 108-132, and/or other components by software; hardware; firmware; some combination of software, hardware, and/or firmware; and/or other mechanisms for configuring processing capabilities on processor(s) 136. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108-132 are illustrated in FIG. 1 as being implemented within a single processing unit, in implementations in which processor(s) 136 includes multiple processing units, 108-132 may be implemented remotely from the other components. The description of the functionality provided by the different components 108-132 described herein is for illustrative purposes, and is not intended to be limiting, as any of components 108-132 may provide more or less functionality than is described. For example, one or more of components 108-132 may be eliminated, and some or all of its functionality may be provided by other ones of components 108-132. As another example, processor(s) 136 may be configured to execute one or more additional components that may perform some or all of the functionality attributed below to one of components 108-132.

Figure 2:
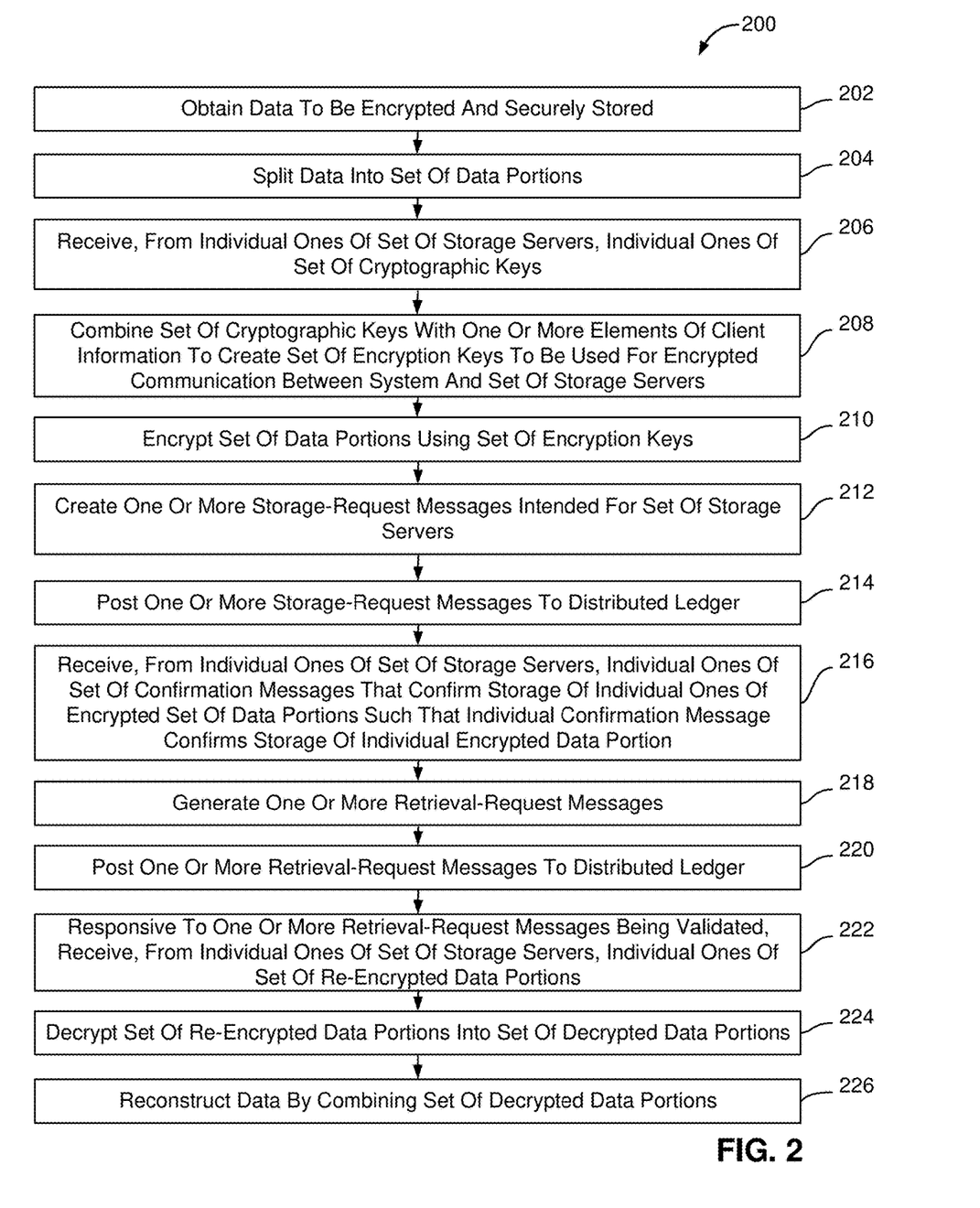
FIG. 2 includes a flow chart of a method for secure storage of encrypted data on a distributed computing platform, the distributed computing platform being based on a distributed ledger, in accordance with one or more implementations.

FIG. 2 illustrates a method 200 for secure storage and retrieval of encrypted data on a distributed computing platform, the distributed computing platform being based on a distributed ledger, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining data to be encrypted and securely stored. Operation 202 may be performed by one or more hardware processors configured by machine-readable instructions including a component that is the same as or similar to data obtaining component 108, in accordance with one or more implementations.

An operation 204 may include splitting the data into a set of data portions. The set of data portions may include a predetermined number of data portions. The predetermined number may be greater than one. Operation 204 may be performed by one or more hardware processors configured by machine-readable instructions including a component that is the same as or similar to data splitting component 110, in accordance with one or more implementations.

An operation 206 may include receiving, from individual ones of a set of storage servers, individual ones of a set of cryptographic keys. The set of storage servers may include the predetermined number of storage servers. Operation 206 may be performed by one or more hardware processors configured by machine-readable instructions including a component that is the same as or similar to key receiving component 112, in accordance with one or more implementations.

An operation 208 may include combining the set of cryptographic keys with one or more elements of client information to create a set of encryption keys to be used for encrypted communication between the system and the set of storage servers. An individual encryption key may correspond to an individual storage server from the set of storage servers. Operation 208 may be performed by one or more hardware processors configured by machine-readable instructions including a component that is the same as or similar to key creation component 114, in accordance with one or more implementations.

An operation 210 may include encrypting the set of data portions using the set of encryption keys. Operation 210 may be performed by one or more hardware processors configured by machine-readable instructions including a component that is the same as or similar to encryption component 116, in accordance with one or more implementations.

An operation 212 may include creating one or more storage-request messages intended for the set of storage servers. The one or more storage-request messages may include the encrypted set of data portions. Operation 212 may be performed by one or more hardware processors configured by machine-readable instructions including a component that is the same as or similar to message creating component 118, in accordance with one or more implementations.

An operation 214 may include posting the one or more storage-request messages to the distributed ledger. Operation 214 may be performed by one or more hardware processors configured by machine-readable instructions including a component that is the same as or similar to message posting component 120, in accordance with one or more implementations.

An operation 216 may include receiving, from individual ones of the set of storage servers, individual ones of a set of confirmation messages that confirm storage of individual ones of the encrypted set of data portions such that an individual confirmation message confirms storage of an individual encrypted data portion. Operation 216 may be performed by one or more hardware processors configured by machine-readable instructions including a component that is the same as or similar to confirmation receiving component 122, in accordance with one or more implementations. In some implementations, a method for secure storage of encrypted data may be completed at this operation. In some implementations, a method for retrieval of securely stored data may begin at operation 218.

An operation 218 may include generating one or more retrieval-request messages. The one or more retrieval-request messages may include a particular cryptographic key and a digital signature. Operation 218 may be performed by one or more hardware processors configured by machine-readable instructions including a component that is the same as or similar to message creating component 118, in accordance with one or more implementations.

An operation 220 may include posting the one or more retrieval-request messages to a distributed ledger. Operation 220 may be performed by one or more hardware processors configured by machine-readable instructions including a component that is the same as or similar to message posting component 120, in accordance with one or more implementations.

An operation 222 may include, responsive to the one or more retrieval-request messages being validated, receiving, from individual ones of the set of storage servers, individual ones of a set of re-encrypted data portions. An individual storage server may have created an individual re-encrypted data portion by decrypting an individual encrypted data portion (e.g., a previously encrypted data portion as described in operation 210) and subsequently encrypting this decrypted individual data portion with the particular cryptographic key. Operation 222 may be performed by one or more hardware processors configured by machine-readable instructions including a component that is the same as or similar to data receiving component 132, in accordance with one or more implementations.

An operation 224 may include decrypting the set of re-encrypted data portions into a set of decrypted data portions. Operation 224 may be performed by one or more hardware processors configured by machine-readable instructions including a component that is the same as or similar to decryption component 124, in accordance with one or more implementations.

An operation 226 may include reconstructing the data by combining the set of decrypted data portions. Operation 226 may be performed by one or more hardware processors configured by machine-readable instructions including a component that is the same as or similar to data reconstruction component 126, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for secure storage of encrypted data on a distributed computing platform, the distributed computing platform being based on a distributed ledger, the system comprising:
   one or more hardware processors configured by machine-readable instructions to:
     obtain data to be encrypted and securely stored;
     split the data into a first predetermined number of data portions, wherein the first predetermined number is greater than one;
     receive, from each one of a set of a second predetermined number of storage servers, a respective cryptographic key, wherein the first predetermined number and the second predetermined number are equal;
     combine each cryptographic key with one or more elements of client information to create a respective encryption key to be used for encrypted communication between the system and the respective storage server;
     encrypt each data portion using the respective encryption key;

create one or more storage-request messages intended for the set of storage servers, wherein the one or more storage-request messages include the encrypted data portions;

post the one or more storage-request messages to the distributed ledger; and receive, from each storage server, a confirmation message that confirms storage of a respective data portion.

2. The system of claim 1, wherein the distributed computing platform supports a virtual machine.

3. The system of claim 1, wherein the distributed computing platform includes storage configured to store the distributed ledger.

4. The system of claim 2, wherein the virtual machine is a Turing-complete and decentralized virtual machine.

5. The system of claim 1, wherein splitting the data into the data portions is performed such that reconstruction of the data requires at least a third predetermined number of the data portions.

6. The system of claim 5, wherein splitting the data into the data portions is performed in a manner based on Shamir's Secret Sharing algorithm.

7. The system of claim 1, wherein receiving a cryptographic key is accomplished through one or more key messages posted to the distributed ledger by the set of storage servers.

8. The system of claim 1, wherein receiving a confirmation message is accomplished through the confirmation message being posted to the distributed ledger by the set of storage servers.

9. The system of claim 1, wherein receiving a respective re-encrypted data portion is accomplished through one or more response messages being posted to the distributed ledger by the set of storage servers.

10. A system configured for retrieval of securely stored encrypted data on a distributed computing platform, the distributed computing platform being based on a distributed ledger, the system comprising:

one or more hardware processors configured by machine-readable instructions to:

generate one or more retrieval-request messages, wherein each of the one or more retrieval-request messages includes a respective cryptographic key and a digital signature;

post the one or more retrieval-request messages to the distributed ledger;

responsive to the one or more retrieval-request messages being validated, receive, from each one of a set of a predetermined number of storage servers, a respective re-encrypted data portion, wherein the predetermined number is greater than one, wherein each storage server from the set of storage servers has created the respective re-encrypted data portion by decrypting a respective encrypted data portion and subsequently encrypting the decrypted individual data portion with the respective cryptographic key;

decrypt the set of re-encrypted data portions into a set of decrypted data portions; and reconstruct data by combining the set of decrypted data portions.

11. A method for secure storage and retrieval of encrypted data on a distributed computing platform, the distributed computing platform being based on a distributed ledger, the method comprising:

obtaining data to be encrypted and securely stored;

splitting the data into a first predetermined number of data portions, wherein the first predetermined number is greater than one;

receiving, from each one of a set of a second predetermined number of storage servers, a respective cryptographic key, wherein the first predetermined number and the second predetermined number are equal;

combining each cryptographic key with one or more elements of client information to create a respective encryption key to be used for encrypted communication between the system and the respective storage server;

encrypting each data portion using the respective encryption key;

creating one or more storage-request messages intended for the set of storage servers, wherein each of the one or more storage-request messages includes a respective one of the encrypted data portions;

posting the one or more storage-request messages to the distributed ledger;

receiving, from each storage server, a confirmation message that confirms storage of a respective data portion;

generating one or more retrieval-request messages, wherein each of the one or more retrieval-request messages includes a respective cryptographic key and a digital signature;

posting the one or more retrieval-request messages to the distributed ledger;

responsive to the one or more retrieval-request messages being validated, receiving, from each storage server, a respective re-encrypted data portion, wherein each storage server has created the respective re-encrypted data portion by decrypting the respective encrypted data portion and subsequently encrypting the decrypted respective data portion with the respective cryptographic key;

decrypting the re-encrypted data portions into decrypted data portions; and reconstructing the data by combining the decrypted data portions.

12. The method of claim 11, wherein the distributed computing platform supports a virtual machine.

13. The method of claim 11, wherein the distributed computing platform includes storage configured to store the distributed ledger.

14. The method of claim 12, wherein the virtual machine is a Turing-complete and decentralized virtual machine.

15. The method of claim 11, wherein splitting the data into the data portions is performed such that reconstruction of the data requires at least a third predetermined number of the data portions.

16. The method of claim 15, wherein splitting the data into the data portions is performed in a manner based on Shamir's Secret Sharing algorithm.

17. The method of claim 11, wherein the one or more elements of client information is shared with the individual storage server.

18. The method of claim 11, wherein receiving a cryptographic key is accomplished through one or more key messages posted to the distributed ledger by the set of storage servers.

19. The method of claim 11, wherein receiving the confirmation message is accomplished through the confirmation message being posted to the distributed ledger by the set of storage servers.

20. The method of claim 11, wherein receiving a respective re-encrypted data portion is accomplished through one or more response messages being posted to the distributed ledger by the set of storage servers.

* * * * *